(12) United States Patent
Laughlin

(10) Patent No.: US 9,983,361 B2
(45) Date of Patent: May 29, 2018

(54) GRIN-LENSED, TUNED WEDGE WAVEGUIDE TERMINATION AND METHOD OF REDUCING BACK REFLECTION CAUSED THEREBY

(75) Inventor: Richard H. Laughlin, Tyler, TX (US)

(73) Assignee: Greg S. Laughlin, Cedar Park, TX (US)

( * ) Notice: Subject to any disclaimer, the term of this patent is extended or adjusted under 35 U.S.C. 154(b) by 0 days. days.

(21) Appl. No.: 13/569,986

(22) Filed: Aug. 8, 2012

(65) Prior Publication Data

US 2013/0039619 A1 Feb. 14, 2013

Related U.S. Application Data

(60) Provisional application No. 61/521,222, filed on Aug. 8, 2011.

(51) Int. Cl.
*G02B 6/32* (2006.01)
(52) U.S. Cl.
CPC ..................... *G02B 6/32* (2013.01)
(58) Field of Classification Search
None
See application file for complete search history.

(56) References Cited

U.S. PATENT DOCUMENTS

| | | | | |
|---|---|---|---|---|
| 6,263,133 | B1* | 7/2001 | Hamm | 385/33 |
| 6,556,733 | B2* | 4/2003 | Dy et al. | 385/11 |
| 7,924,493 | B2* | 4/2011 | Takei et al. | 359/280 |
| 2002/0097956 | A1* | 7/2002 | Kikuchi | G02B 6/327 385/33 |
| 2002/0150333 | A1* | 10/2002 | Reed | A61B 5/0084 385/34 |
| 2005/0201662 | A1* | 9/2005 | Petersen | A61B 5/0066 385/12 |
| 2011/0091156 | A1* | 4/2011 | Laughlin | 385/34 |

* cited by examiner

*Primary Examiner* — Charlie Y Peng

(57) ABSTRACT

A GRIN-lensed, tuned wedge waveguide termination, a method of reducing back reflection to a waveguide caused by the GRIN-lensed, tuned wedge waveguide termination and a terminated optical fiber. In one embodiment, the GRIN-lensed, tuned wedge waveguide termination includes: (1) a GRIN lens subassembly including a GRIN lens having a pitch greater than a quarter pitch such that a primary beam propagating through the GRIN lens subassembly forms a waist and (2) a tuned wedge subassembly bonded to the GRIN lens subassembly and having a length selected such that the tuned wedge subassembly ends at least proximate the waist, the tuned wedge subassembly further having a bevel angle selected to reduce a back reflection into the waveguide.

20 Claims, 6 Drawing Sheets

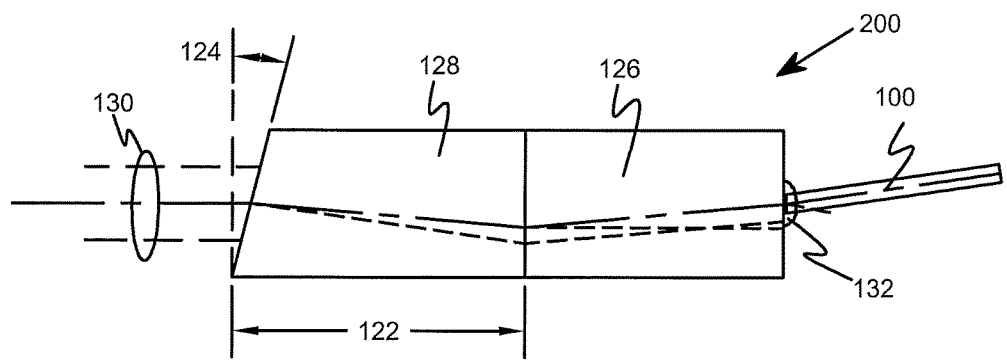
Figure 2
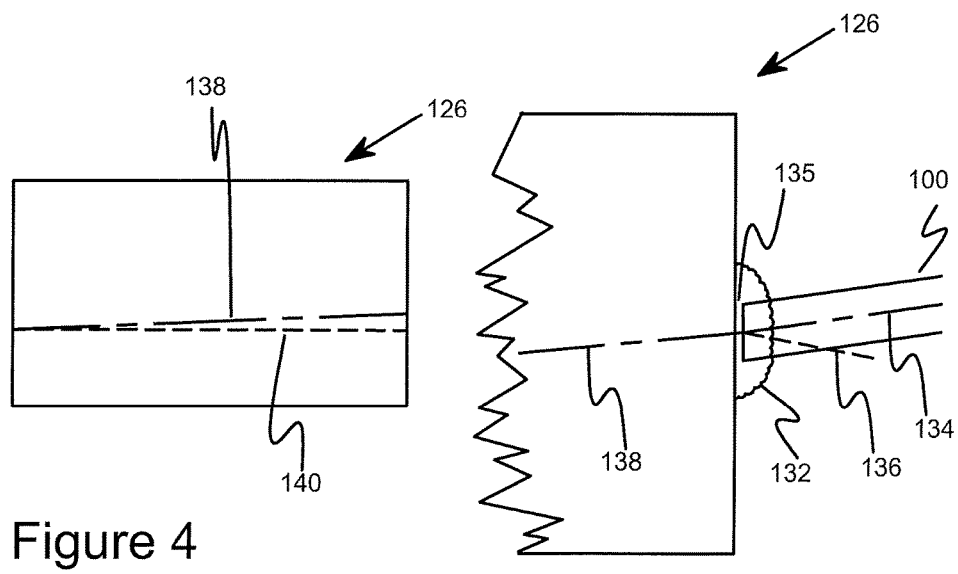
Figure 4
Figure 3

GRIN-LENSED, TUNED WEDGE WAVEGUIDE TERMINATION AND METHOD OF REDUCING BACK REFLECTION CAUSED THEREBY

CROSS-REFERENCE TO RELATED APPLICATION

This application claims the benefit of U.S. Provisional Application Ser. No. 61/521,222, filed by Laughlin on Aug. 8, 2011, entitled "System and Method for Fiber Beam and Expansion Without Reflective Coating," commonly assigned with this application and incorporated herein by reference.

TECHNICAL FIELD

This application is directed, in general, to optical waveguide terminations and, more specifically, to a GRIN-lens-based waveguide terminations and method of reducing back reflections associated with a tuned wedge waveguide termination.

BACKGROUND

Various optical network applications require an optical beam exiting a fiber to be expanded. Consequently, a variety of fiber "terminations" (structures for terminating a fiber and expanding the beam exiting it) have been developed to address this requirement. One general type of fiber termination produces an at least substantially collimated optical beam. Examples of this type are a ball-lensed collimators, e.g., of FIG. 1A, and gradient index of refraction, or "GRIN,"-lensed collimators, e.g., that of FIGS. 1B and 1C.

The ball-lensed collimator of FIG. 1A accepts a fiber 100 proximate the focal plane of the ball lens 104. The collimator in some cases has a protective transparent plate 106. Air interfaces (unreferenced) lie between the end of the fiber 100, the surface of the ball lens 104 and the surface of the transparent plate 106. Unfortunately, Fresnel back reflections occur not only at the air interface between the end of the fiber 100 and the surface of the ball lens 104 but also the air interface between the ball lens 104 and the transparent plate 106. These Fresnel back reflections are typically −10 dB to −15 dB, which have become unacceptable.

To reduce the back reflections, an antireflection (AR) coating 102 may be added to one or more of the end of the fiber 100, the surface of the ball lens 104 and the surface of the transparent plate 106. These typically reduce the reflection to a range from −24 dB to −45 db, depending on the optical bandwidth and the type and quality of AR coating applied. Unfortunately, many of these AR coatings 102 cannot withstand exposure to extreme temperatures, chemicals or abrasion.

The orthogonal GRIN-lensed collimator of FIG. 1B is becoming increasingly accepted. The collimator of FIG. 1B accepts a fiber 100 proximate a quarter-pitch GRIN lens 108. Unfortunately, the air interface between the fiber 100 and the quarter-pitch GRIN lens 108 and at the exit of the quarter-pitch GRIN lens 108 exhibit Fresnel back reflections of −48 dB and −12 dB, respectively. As above, AR coatings may be employed to mitigate the back reflections. Unfortunately, an epoxy 109 is required to affix the fiber 100 to the quarter-pitch GRIN lens 108. Consequently, the resulting epoxy interface can increase the Fresnel back reflection to −25 dB.

The beveled GRIN-lensed collimator of FIG. 1C addresses some of the shortcomings of the orthogonal GRIN-lensed collimator of FIG. 1B. The quarter-pitch GRIN lens 108 is provided with bevels 110. The fiber 100 is beveled to match the bevel 110 such that the Fresnel back reflection generated epoxy interface does not substantially re-enter the fiber 100. The bevel 110 at the opposing end of the quarter-pitch GRIN lens 108 serves the same purpose, namely to keep the Fresnel back reflection from substantially reentering the fiber 100. Unfortunately, this causes a beam 111 carried in the fiber 100 to exit the quarter-pitch GRIN lens 108 at a nonzero angle 112 with respect to the optical axis of the quarter-pitch GRIN lens 108. This angle is typically on the order of 8°. Also disadvantageous is the fact that while the back reflections have been rerouted, the losses they represent remain.

Many specifications today, such as MIL-DTL-38999, specify a maximum of −35 dB back reflection. As the ability to measure back reflection has increased to −50 dB and perhaps beyond, demand is building for waveguide terminations having less than a −50 dB back reflection, while exhibiting a relatively low insertion loss.

SUMMARY

One aspect provides a GRIN-lensed, tuned wedge waveguide termination. In one embodiment, the GRIN-lensed, tuned wedge waveguide termination includes: (1) a GRIN lens subassembly including a GRIN lens having a pitch greater than a quarter pitch such that a primary beam propagating through the GRIN lens subassembly forms a waist and (2) a tuned wedge subassembly bonded to the GRIN lens subassembly and having a length selected such that the tuned wedge subassembly ends at least proximate the waist, the tuned wedge subassembly further having a bevel angle selected to reduce a back reflection into the waveguide.

Another aspect provides a method of reducing back reflection to a waveguide caused by the GRIN-lensed, tuned wedge waveguide termination. In one embodiment, the method includes: (1) providing a GRIN-lensed, tuned wedge waveguide termination, including a GRIN lens subassembly having a GRIN lens having a pitch greater than a quarter pitch and a tuned wedge subassembly having a thickness selected such that the tuned wedge subassembly ends proximate a waist produced when a primary beam is caused to propagate through the GRIN-lensed, tuned wedge waveguide termination and a bevel angle selected to reduce back reflections, (2) forming a primary beam in the waveguide, (3) placing a reflective surface proximate the tuned wedge subassembly to direct a reflection of the primary beam back toward the waveguide, (4) monitoring the reflection, (5) adjusting a lateral position of the face relative to the GRIN lens subassembly to increase a magnitude of the reflection entering the waveguide and (6) moving the reflective surface to redirect the reflection away from the waveguide.

In another embodiment, the method includes: (1) providing a GRIN-lensed, tuned wedge waveguide termination, including a GRIN lens subassembly having a GRIN lens having about a quarter pitch and a tuned wedge subassembly having a thickness selected such that the tuned wedge subassembly projects a substantially collimated beam when a primary beam is caused to propagate through the GRIN-lensed, tuned wedge waveguide termination and a bevel angle selected to reduce back reflections, (2) forming a primary beam in the waveguide, (3) placing a reflective surface proximate the tuned wedge subassembly to direct a reflection of the primary beam back toward the waveguide, (4) monitoring the reflection, (5) adjusting a lateral position of the face relative to the GRIN lens subassembly to increase a magnitude of the reflection entering the waveguide and (6) moving the reflective surface to redirect the reflection away from the waveguide.

Yet another aspect provides a terminated optical fiber. In one embodiment, the terminated optical fiber includes: (1) a GRIN-lensed, tuned wedge fiber termination, having: (1a) a GRIN lens subassembly including a GRIN lens having a pitch greater than a quarter pitch such that a primary beam propagating through the GRIN lens subassembly forms a waist and (1b) a tuned wedge subassembly bonded to the GRIN lens subassembly and having a length selected such that the tuned wedge subassembly ends at least proximate the waist, the tuned wedge subassembly further having a bevel angle selected to reduce a back reflection into the fiber and (2) an optical fiber coupled to the GRIN-lensed, tuned wedge fiber termination and having a face, a spacing between the face and the GRIN lens subassembly selected based on the back reflection.

BRIEF DESCRIPTION

Reference is now made to the following descriptions taken in conjunction with the accompanying drawings, in which:

FIG. 2 is a schematic diagram of one embodiment of a GRIN-lensed, tuned wedge waveguide termination;

FIG. 3 is a schematic diagram of a first portion of the GRIN-lensed, tuned wedge waveguide termination embodiment of FIG. 2;

FIG. 4 is a schematic diagram of a second portion of the GRIN-lensed, tuned wedge waveguide termination embodiment of FIG. 2;

DETAILED DESCRIPTION

Figure 1A:
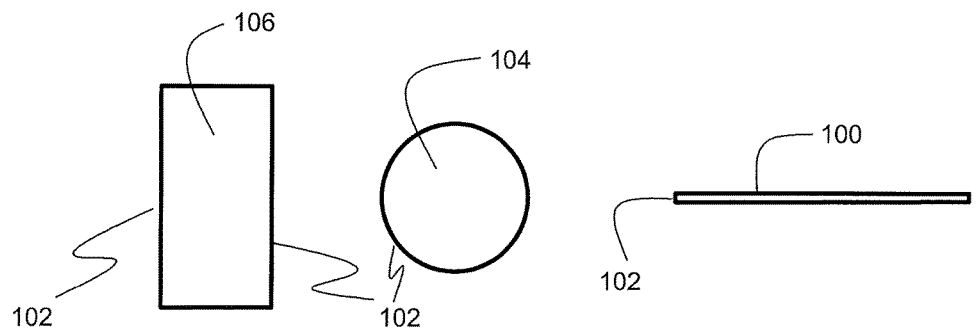
FIG. 1A is a schematic diagram of a conventional ball-lensed collimator.
Figure 1B:
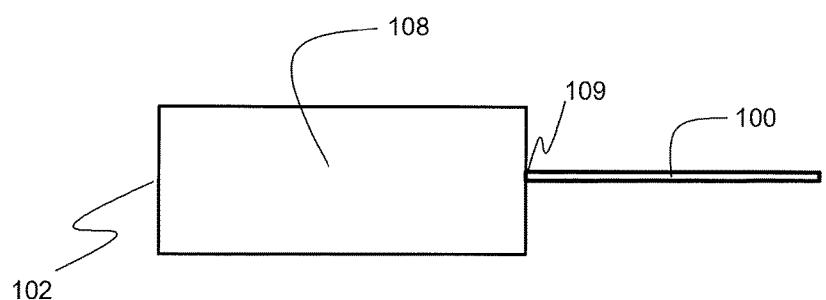
FIGS. 1B and 1C are schematic diagrams of conventional GRIN-lensed collimators.
Figure 1C:
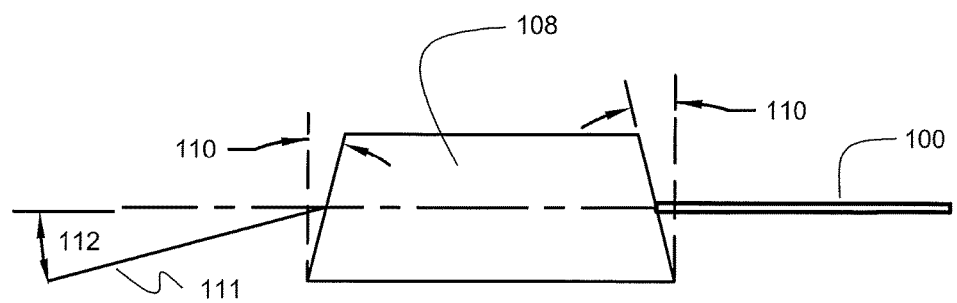

It is realized herein that a quarter-pitch GRIN lens produces a primary beam that is fully spread as it exits the quarter-pitch GRIN lens. It is further realized herein that, because the primary beam is fully spread, a substantial fraction of its total energy cannot be captured and is therefore lost. It is realized herein that their reliance on of quarter-pitch GRIN lenses is, at least in part, why the conventional orthogonal and beveled GRIN-lensed collimators described in the Background above exhibit significant insertion losses. It is also realized herein that the acute disadvantages of quarter-pitch GRIN lenses in this regard apparently have not been appreciated in the prior art, because quarter-pitch GRIN lenses have many positive qualities in other applications and are therefore widely accepted and employed.

Consequently, it is still further realized herein that a GRIN lens having a greater-than-quarter-pitch would advantageously produce a primary beam that is converging as it exits the GRIN lens, and that this converging continues until a "waist" is formed (see, e.g., Van Buren, et al., "Foundations for Low-Loss Fiber Gradient-Index Lens Pair Coupling With the Self-Imaging Mechanism," J. Appl. Opt., Vol. 42, pp. 550-565 (2003)). It is yet further realized that if the waveguide termination is designed to end at or near this "waist," a very large fraction of the energy of the primary beam can advantageously be captured at the end of the waveguide termination. It is still yet further realized that a tuned wedge subassembly can be provided with a particular thickness such that the tuned wedge subassembly ends at or near this waist to allow this very large fraction of the energy of the primary beam to be captured. It is yet still further realized that the tuned wedge subassembly can be provided with a particular bevel angle such that the tuned wedge subassembly can further serve to attenuate back reflections. It is still yet further realized that the optical axis of the GRIN lens can be offset relative to the optical tuned wedge subassembly to cause the primary beam to exit the tuned wedge subassembly at or near its optical axis. It is finally realized that the connection between the optical wedge waveguide termination as a whole and the fiber can be tuned to reduce back reflections further.

Introduced herein are various embodiments of a tuned wedge waveguide termination employing a GRIN lens subassembly having a pitch greater than one quarter and a tuned wedge subassembly having a particular bevel angle and thickness. The GRIN lens subassembly includes a GRIN lens having a greater-than-quarter-pitch to reduce insertion loss. The tuned wedge subassembly is located relative to the GRIN lens subassembly such that it captures more of the primary beam. An angle at which the optical waveguide is attached to the tuned wedge waveguide termination and an offset between the optical axes of the GRIN lens subassembly and the optical wedge subassembly are also selected to decrease insertion loss. The tuned wedge subassembly further it has a bevel angle and thickness selected to reduce back reflection. In addition, a method of tuning the connection between the optical wedge waveguide termination as a whole and the waveguide, which is often a fiber, is introduced through which back reflections can be reduced further. Consequently, certain embodiments to be illustrated and described have a back reflection of less than about −50 dB and perhaps less than about −60 dB.

Thus, the above-described embodiments employ a GRIN lens that has more than a quarter pitch (defined as a pitch of 0.26 or greater). Quarter-pitch GRIN lenses are not only outside the scope of the above-described embodiments, but are utterly incapable of producing the "waist" that gives rise to the possibility of capturing the very large fraction of the energy of the primary beam that is the hallmark of the above-described embodiments. As an aside, GRIN lens embodiments described herein further have less than a half-pitch. Some embodiments have a pitch of about 0.45 or less. Still other embodiments have a pitch of about 0.35 or less. Therefore, the GRIN lens of the tuned wedge subassembly GRIN waveguide termination embodiments described herein generally have GRIN lenses of more than quarter-pitch and less than half-pitch. (GRIN lenses having a pitch in excess of a half-pitch fall within the scope of the invention, but may exhibit unnecessary levels of insertion loss due to the unnecessarily extended thickness of the tuned wedge subassembly.)

Also introduced herein are alternative embodiments of a tuned wedge waveguide termination employing a GRIN lens subassembly having about quarter pitch and a tuned wedge subassembly having a particular bevel angle and thickness. Unlike the above-described embodiments, the quarter-pitch GRIN lens of these embodiments is incapable of producing a waist. Consequently, the tuned wedge subassembly projects a substantially collimated beam when a primary beam is caused to propagate through the waveguide termination. Some related embodiments also call for the face of the waveguide to butt against, rather than spaced apart from, the GRIN lens subassembly. Thus, in these related embodiments, a tuning method introduced herein that involves tuning the spacing between the face of the waveguide and the GRIN lens subassembly is not carried out.

In embodiments to be illustrated and described, the waveguide takes the form of an optical fiber. FIG. 2 is a schematic diagram of one embodiment of a GRIN tuned wedge waveguide termination 200, including a GRIN lens subassembly 126 and a tuned wedge subassembly 128, that terminates an optical fiber 100. In general, the GRIN lens subassembly 126 expands the beam from the fiber 100 and collimates, or approximately collimates, the primary beam from the fiber 100. The GRIN lens subassembly 126 includes a GRIN lens. In general, the tuned wedge subassembly 128 controls back reflections in the GRIN tuned wedge waveguide termination 200. In a manner to be described below, the tuned wedge subassembly 128 has a wedge angle 124 and a wedge thickness 122 that can be tuned to reduce back reflections, typically to less than about −50 dB, and perhaps to about −60 dB, while maintaining the primary beam substantially near the optical axis, substantially normal to the reference plane and with limited off-axis aberrations.

A bonding material 132 attaches the optical fiber 100 to the GRIN lens subassembly 126. In the illustrated embodiment, both the bonding material 132 and the GRIN lens subassembly 126 have indices of refraction that substantially differ from the index of refraction of the core of the fiber 100. As an example, if a commercially available Corning® SMF-28™ fiber, having a core index of refraction $n_c$=1.468, is to be terminated, an epoxy bonding material having an index of refraction $n_e$=1.52 and a GRIN lens subassembly 126 having an index of refraction of $n_g$=1.59 can be used to terminate the fiber. Based on known electromagnetic field theory, the reflection given these indices varies from about −27.9 dB to about −46.1 dB, depending on the spacing between the fiber 100 and the GRIN lens subassembly 126.

As an aside, the ideal index of refraction for the bonding material is the product of the square root of the core index of refraction $n_c$ and the GRIN core index of refraction $n_g$ (viz., $n_e$≈1.53). It is often impractical to attain such an index in practice, thus an index approximating the ideal is acceptable, and any back reflection resulting from the mismatch can be attenuated afterwards in a tuning process.

The Fresnel back reflection at the interface between the fiber 100 and the GRIN lens subassembly 126 is a function of the refraction $r_1$ at the interface between the fiber 100 and the bonding material 132 and the refraction $r_2$ at the interface between the bonding material 132 and the GRIN lens subassembly 126, viz.:

$$r_1=(n_c-n_e)^2/(n_c+n_e)^2;\ \text{and}$$

$$r_2=(n_e-n_g)^2/(n_e+n_g)^2.$$

Thus, Rmin and Rmax are as follows:

$$R\text{min}=10*\log_{10}(((r_1)^{0.5}-(r_2)^{0.5})^2)\approx-46\ \text{dB; and}$$

$$R\text{max}=10*\log_{10}(((r_1)^{0.5}+(r_2)^{0.5})^2)\approx-27.9\ \text{dB}.$$

In one embodiment, a second bonding agent (e.g., an epoxy) (not shown) is employed to attach the GRIN lens subassembly 126 to the tuned wedge subassembly 128. While a back reflection exists at the interface between the GRIN lens subassembly 126, the second bonding agent and the optical tuned wedge subassembly 128, a more significant back reflection is at the interface between the optical wedge, assuming $n_w$=1.59, and the air, $n_o$=1, is about −12.8 dB.

FIG. 3 details the interface 135 between the fiber 100, the bonding agent 132 and the GRIN lens subassembly 126. The primary beam 134 travels down the optical fiber 100. At the interface 135, a portion of the primary beam 134 is reflected. The back reflection typically ranges from about −20 dB to about −56 dB relative to the primary beam 134. In the illustrated embodiment, the face of the fiber 100 is substantially beveled such that the reflected beam 136 is not efficiently coupled back into the fiber 100 core. In an alternative embodiment, some or all of the face of the GRIN lens subassembly 126 that is bonded to the face of the optical fiber 100 is substantially beveled. In either embodiment, the longitudinal axis of the GRIN lens subassembly 126 is misaligned with respect to a longitudinal axis of the optical fiber 100 at a substantially nonzero angle. In general, the angle is substantially nonzero when it equals or exceeds about 1° or is otherwise intended to be nonzero (as opposed to being nonzero as a result of an accidental misalignment).

In one embodiment a bevel of 1° is applied to the fiber, which introduces a coupling loss of about −4 dB from the resulting back reflection. In another embodiment, a 4.2° bevel is introduced to the face, which introduces a coupling loss of less than about −60 dB from the resulting back reflection. The primary beam 134 is refracted as defined by Snell's Law and produces a refracted beam 138 in the GRIN lens subassembly 138.

FIG. 4 presents the GRIN lens subassembly 126 in greater detail. As those skilled in the art are aware quarter-pitch GRIN lens can be treated as an angle/displacement transformer, transforming an angle at one face to a displacement at the other face and a displacement at one face to an angle at the other face. This transform can be defined as:

Tangent (angle)=displacement/effective focal length.

In one embodiment the effective focal length is 1.5 mm.

Figure 5:
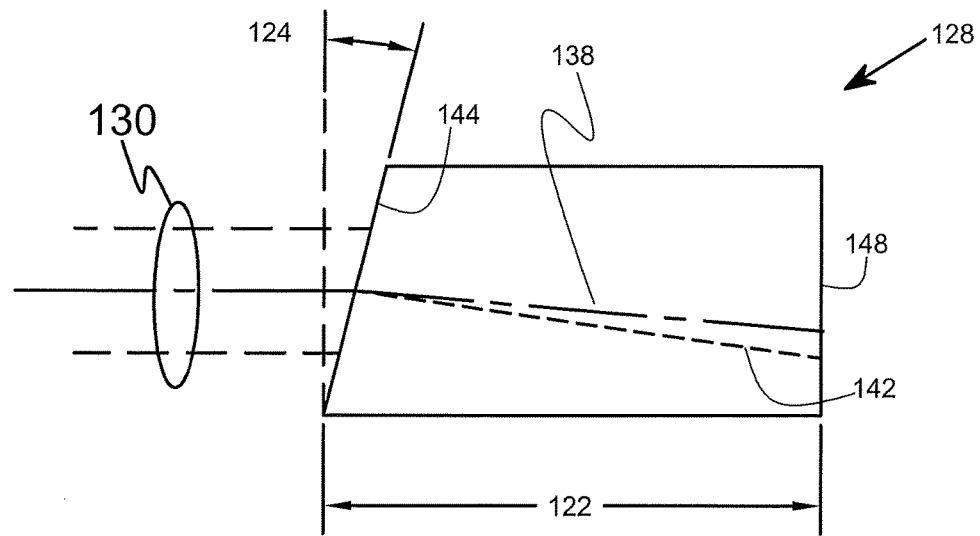
FIG. 5 is a schematic diagram of one embodiment of the tuned wedge subassembly in the GRIN-lensed, tuned wedge waveguide termination embodiment of FIG. 2.

When the primary beam 138 in the GRIN lens subassembly 126 encounters the interface between the GRIN lens subassembly 126 and the tuned wedge subassembly 128, a back reflection occurs. With particular reference to FIG. 5, the refracted beam 138 from the GRIN lens subassembly 126 enters the tuned wedge subassembly 128 at an angle. The displacement of the refracted beam 138 is determined by the effective focal length of the GRIN lens subassembly 126 and the angle and displacement of the fiber 100 at the focal plane 135 of the GRIN lens subassembly 126. When the refracted beam 138 strikes the beveled face 144, it is again refracted into the output beam 130. The optical axis of the output beam 130 is aligned approximately perpendicular to a reference plane 148. In one embodiment the reference plane 148 is the opposing face from the beveled face 144. One skilled in the pertinent art will recognize there are many methods to define or establish a reference plane 148.

Figure 6:
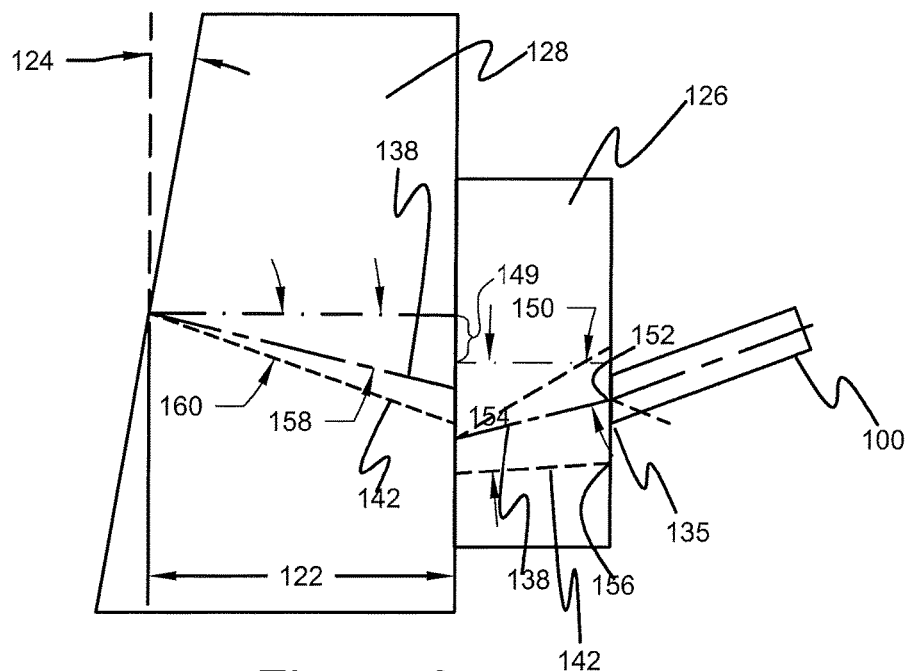
FIG. 6 illustrates the back reflection of a primary beam.

In FIG. 6, the back reflection of the primary, refracted, beam is presented. It is recognized by those skilled in the art that, as a general rule, increasing the off-axis position at the focal plane increases aberrations and will result in a larger blur circle, which in turn introduces increased coupling loss of the beam into the fiber 100. The cost of manufacturing optical wedges generally increases as the bevel angle and thickness-to-diameter ratios increase.

In the illustrated embodiment, the displacement 152 and angle 150 of the primary beam 138 at the focal plane 135 of the GRIN lens subassembly 126, which results from the tuning of the bevel angle 124 and the thickness 122 of the tuned wedge subassembly 128, are defined by the equations below. Also defined are the displacement 156 and angle 154 of the reflected beam 142 at the focal plane 135 of the GRIN lens subassembly 126.

An example of optical tuning will now be set forth in which the following will be assumed: the index of refraction of the wedge, n, equals 1.5981; the mode field diameter fiber 100 (microns), w, equals 9.2; the numerical aperture of fiber 100, na, equals 0.14; the acceptance angle/2 of the fiber 100, pf, equals a sin(na/n); the effective focal length of the GRIN lens subassembly 126 (mm), fl, equals 1.53 and the wavelength of the primary beam in (microns), y, equals 1.31. The parameters to be tuned are the thickness of the optical wedge, t; and the angle 124 of the optical tuned wedge subassembly 128, $p_1$. Given these, the refracted beam 138 at the tuned wedge subassembly 128 from the normal to the face of the optical wedge 138 is given by:

$$p_2 = a\,\sin(\sin(p_1)/2).$$

The angle 158 of the refracted beam 138 from the optical axis is given by:

$$p_3 = p_1 - p_2.$$

The angle 160 of the reflected beam 142 from the optical axis is given by:

$$p_4 = p_1 + p_2.$$

The displacement 138 of the refracted beam at the interface between the GRIN lens subassembly 126 and the tuned wedge subassembly 128 is given by:

$$d_1 = t^* \tan(p_3).$$

The displacement 182 of the reflected beam at the interface between the GRIN lens subassembly 126 and the tuned wedge subassembly 128 is given by:

$$d_2 = t^* \tan(p_4).$$

The angle 150 of the refracted beam at the focal plane 135 of the GRIN lens subassembly 126 is given by:

$$p_5 = a\,\tan(d_1/f_1).$$

The angle 154 of the reflected beam at the focal plane 135 of the GRIN lens subassembly 126 is given by:

$$p_6 = a\,\tan(d_2/f_1).$$

The displacement 152 of the refracted beam 138 at the focal plane 135 of the GRIN lens subassembly 126 is given by:

$$d_3 = f_1^* \tan(p_3).$$

The displacement 156 of the reflected beam 142 at the focal plane 135 of the GRIN lens subassembly 126 is given by:

$$d_4 = f_1^* \tan(p_4).$$

The wedge angle 124 defines the position, displacement 152 of the refracted beam 138 at the focal plane 135. The thickness 122 in conjunction with an offset 149 control the angle of the refracted beam 138 at the focal plane 135 of the GRIN lens subassembly 126. The thickness 122, wedge angle 124 and offset 149 are tuned to produce the desired displacement 152 and angle 150 of the refracted beam 138 and the resulting displacement 156 and angle 154 of the reflected beam 142 such that the displacement 156 and angle 154 of the reflected beam 142 are sufficiently offset from the waveguide 100 optical axis to produce the desired back reflection loss.

Insertion and back reflection losses will now be analyzed. The displacement loss at fiber 100 (assuming that the fiber 100 is centered on the displacement 152) is given by:

$$ld = -4.344^*(1000^*(d_4-d_3)/w)^2.$$

The reflected angle 154 (na) loss at the fiber 100 is given by:

$$lp = -4.344^*(pi^*n^*w^*p6/y)^2.$$

The insertion loss refracted angle 150 (na) loss at the fiber 100 is given by:

$$il = -4.344^*(pi^*n^*w^*p5/y)^2.$$

Finally, the back reflection loss is given by:

$$br = ld + lp.$$

To approximate a minimum insertion loss, the core of the fiber 100 is positioned at the refracted beam 138 and tilted at the refracted beam 138 angle 150. This positioning can be accomplished by calculation and mechanical alignment. In the illustrated embodiment, active alignment is used as discussed in U.S. Patent Application Ser. No. 61/252,090 filed by Laughlin on Dec. 1, 2009, entitled "Environmentally Rugged Free-Space Fiber Waveguide Connector and Method of Manufacture Thereof," and incorporated herein by reference.

In one embodiment, the bevel angle 124 of the tuned wedge subassembly 128 is about 0.75°. This results in a refracted beam 138 at the focal plane 135 of the GRIN lens subassembly 126 having a displacement 152 of about 0.007 mm and an angle 150 of about 1.09°. The reflected beam 142 at the focal plane 135 of the GRIN lens subassembly 126 has a displacement 156 of about 0.032 mm and an angle 154 of about 4.76°. When the fiber 100 is beveled at the refraction angle 150, this results in a relatively low insertion loss less than 0.1 dB and a compound back reflection of about −12.8 dB (at the interface between the tuned wedge subassembly 128 and air), −21.9 dB from the 4.76° angle 154 and −31 dB from the displacement 156 for a total back reflection of less than −60 dB.

Figure 7:
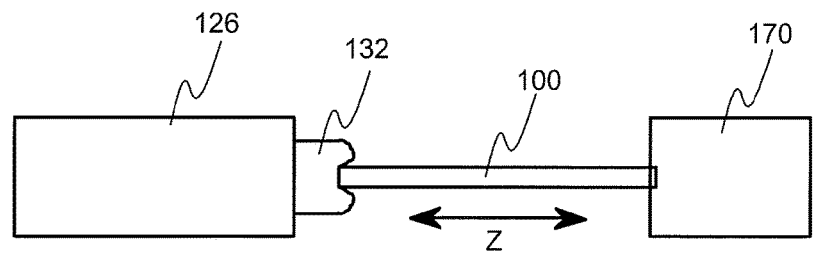
FIG. 7 is a schematic diagram of an optical fiber and a GRIN subassembly illustrating active alignment and spacing of an optical fiber to achieve a reduced back reflection.

FIG. 7 teaches the active alignment and spacing of the fiber 100 to reduce, and perhaps minimize, back reflection. A fiber 100 is attached to a GRIN lens subassembly 126 with a bonding material 132. The fiber 100 is then actively positioned along the z axis by measuring the back reflection with an instrument 170. This is described in the U.S. patent application referenced immediately above.

Figure 8:
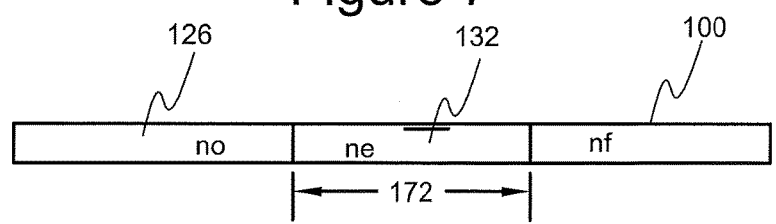
FIG. 8 is a transmission line model of the optical fiber and subassembly of FIG. 7.

The positioning is based on quarter-wave tuning transmission line theory. FIG. 8 represents the transmission line model of FIG. 7. The optical impedance, is defined as the index of refraction. The index of refraction is $n_o$ for the optical-subassembly 128; the index of refraction is $n_e$ for the bonding agent 132; and the index of refraction is $n_f$ for the fiber 100 core. The Fresnel reflection at the refraction $r_1$ at the interface between the fiber 100 and the bonding material 132 and the refraction $r_2$ at the interface between the bonding material 132 and the GRIN lens subassembly 126, viz.:

$$r_1 = (n_c - n_e)^2/(n_c + n_e)^2; \text{ and}$$

$$r_2 = (n_e - n_g)^2/(n_e + n_g)^2.$$

Thus, Rmin and Rmax are as follows:

$$Rmin=10*\log_{10}((r_1)^{0.5}-(r_2)^{0.5})^2)\approx-46 \text{ dB; and}$$

$$Rmax=10*\log_{10}(((r_1)^{0.5}+(r_2)^{0.5})^2)\approx-27.9 \text{ dB}.$$

Figure 9:
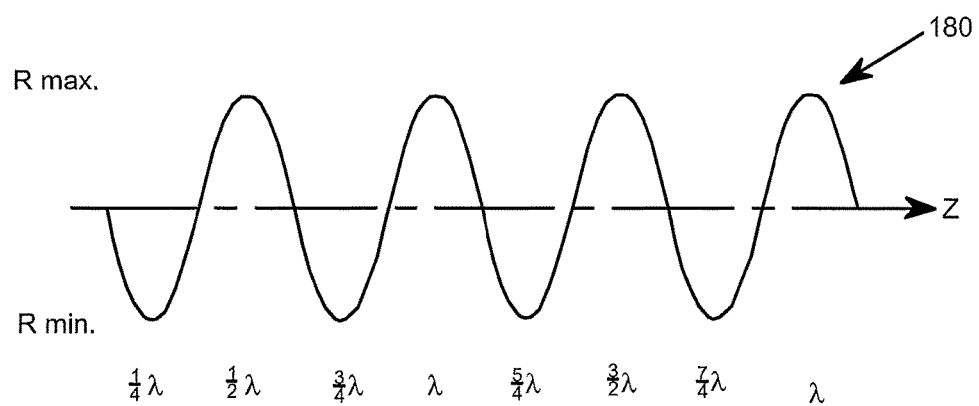
FIG. 9 is a graph of back reflection as a function of wavelength.

Under ideal conditions, the back reflection Rmin equals zero when $n_e^2=n_g*n_f$. Unfortunately, it is difficult to find materials that exactly match $n_e$. FIG. 9 presents the back reflection 180 as measured by an instrument 170. The back reflection 180 falls to a minimum every odd multiple of a quarter wavelength (λ) and a maximum every even multiple of a quarter wavelength (λ). In one embodiment $n_f$=1.468; $n_g$=1.52; and $n_o$=1.59. The ideal $n_e$=1.53 for Rmin=0. The actual parameters above, results in a near minimum back reflection, Rmin, of −46 dB and a maximum back reflection 180, Rmax, of −28 dB.

One of the embodiments operates at a wavelength, λ=1.31 microns. Since the minimum reflection Rmin and the maximum reflection Rmax are separated by only a quarter wavelength, in this case 0.3 micron, it can be seen that submicron positioning will be required.

Referring back to FIGS. 7 and 8, the thickness 172 of the bonding agent 132 is adjusted along the Z axis of the fiber 100. By monitoring the back reflection 180 from this interface with instrumentation 170 and adjusting the spacing 172 between the fiber 100 and the GRIN lens subassembly 126, and fixing the position and setting the bonding agent 132, the back reflection 180 can be minimized.

Figure 10:
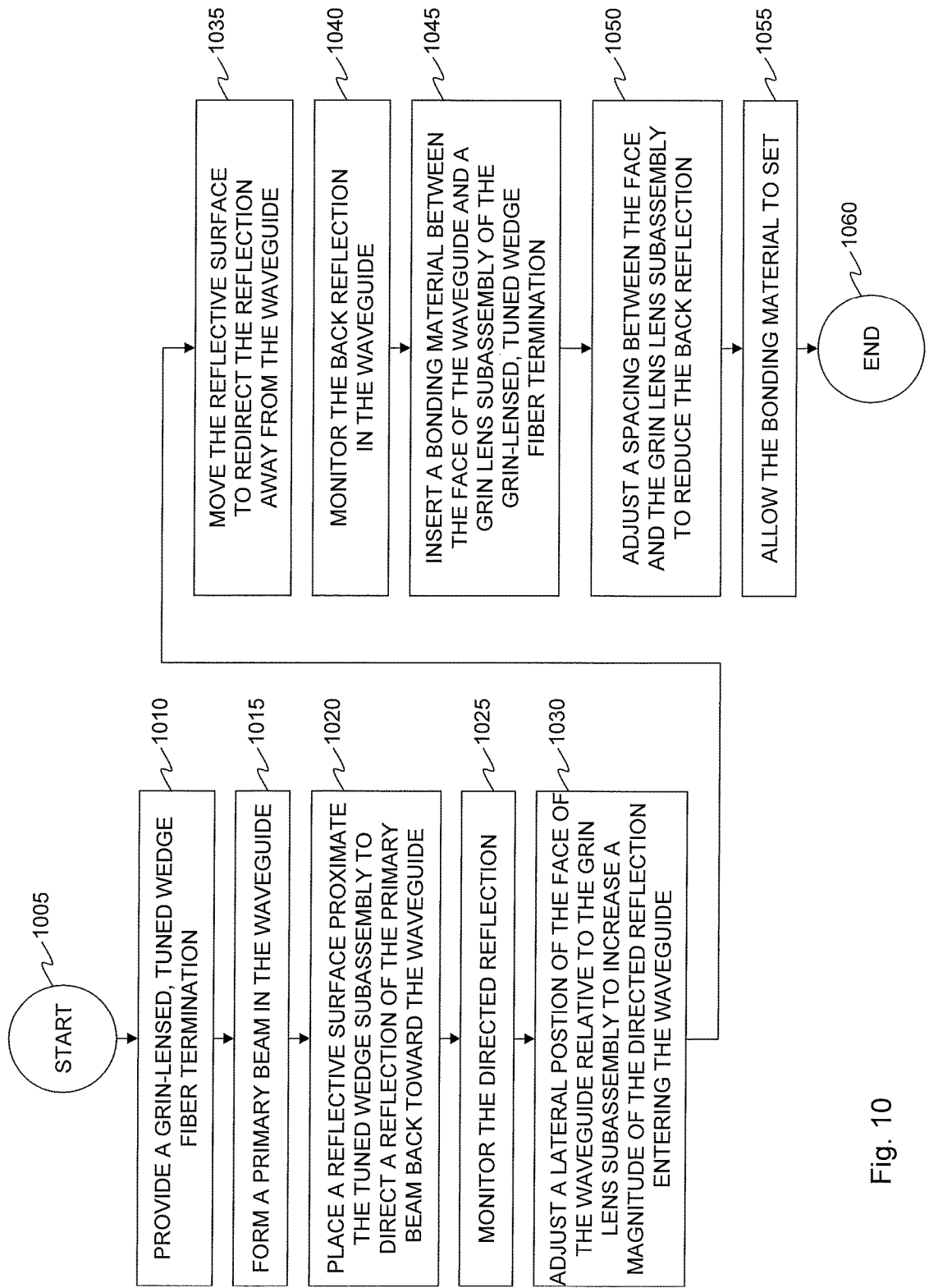
FIG. 10 is a flow diagram of one embodiment of a method of reducing back reflection to a waveguide caused by the GRIN-lensed, tuned wedge waveguide termination.

FIG. 10 is a flow diagram of one embodiment of a flow diagram of one embodiment of a method of reducing back reflection to a waveguide caused by the GRIN-lensed, tuned wedge waveguide termination. The method begins in a start step 1005. In a step 1010, a GRIN-lensed, tuned wedge waveguide termination is provided. The waveguide termination includes a GRIN lens subassembly having a GRIN lens having a pitch greater than a quarter pitch. The waveguide termination further includes a tuned wedge subassembly. The waveguide termination is tuned in the sense that its tuned wedge subassembly has a thickness selected such that the tuned wedge subassembly ends proximate a waist produced when a primary beam is caused to propagate through the waveguide termination. The waveguide termination is further tuned in the sense that a bevel angle of the tuned wedge subassembly is selected to reduce back reflections. In the illustrated embodiment, the waveguide termination is still further tuned in the sense that an offset is provided between the optical axis of the GRIN lens subassembly and the tuned wedge subassembly such that the waveguide termination is designed to terminate a waveguide having an optical axis that is at a predetermined angle with respect to the optical axis of the GRIN lens assembly, which may be a nonzero angle.

In a step 1015, the waveguide is placed proximate the GRIN lens subassembly at the predetermined angle. In a step 1020, a reflective surface is placed proximate the tuned wedge subassembly to direct a reflection of the primary beam back toward the waveguide. In a step 1025, the magnitude of the directed reflection is monitored. In a step 1030, a lateral position of the face of the waveguide is adjusted relative to the GRIN lens subassembly such that the magnitude of the directed reflection entering the waveguide is increased. In one embodiment, the lateral position is adjusted until the magnitude of the directed reflection reaches a maximum, or thereabouts. In a step 1035, the reflective surface is moved such that the reflection is redirected away from the waveguide. At this point, only back reflections caused by the waveguide termination or the interface between the waveguide termination and the waveguide reenter the waveguide. In a step 1045, a bonding material is inserted between the face of the waveguide and the GRIN lens subassembly. In a step 105, a spacing between the face of the waveguide and the GRIN lens subassembly is adjusted to reduce the magnitude of the back reflection. In one embodiment, the spacing is adjusted until the magnitude of the back reflection reaches a minimum, or thereabouts. In a step 1055, the bonding material is allowed to set. The method ends in an end step 1060.

Figure 11:
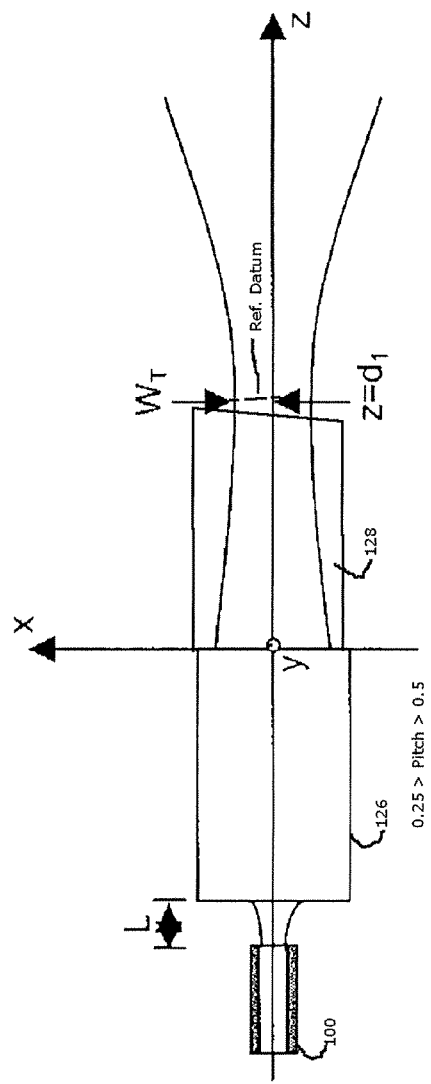
FIG. 11 is a schematic diagram of one embodiment of a GRIN-lensed, tuned wedge waveguide termination showing a primary beam traveling therethrough.

Having described various embodiments of a GRIN-lensed, tuned wedge waveguide termination and a method of tuning the waveguide termination to reduce back reflections further, a diagram showing how the primary beam travels through the fully-tuned GRIN-lensed, tuned wedge waveguide termination is in order. Accordingly, FIG. 11 is a schematic diagram of one embodiment of a GRIN-lensed, tuned wedge waveguide termination showing a primary beam propagating therethrough. The GRIN lens in the GRIN lens subassembly 126 has a greater-than-quarter pitch such that the primary beam is caused to have a waist. As FIG. 11 shows, the waist has a thickness $W_T$ occurring at a distance $Z=D_1$ from the end of the GRIN lens subassembly 126. Accordingly, the thickness of the tuned wedge subassembly 128 is selected such that the waist occurs proximate, and perhaps at, the end of the tuned wedge subassembly 128 that is distal from the GRIN lens subassembly 126. A bevel angle is also selected for the tuned wedge subassembly 128 that reduces back reflections. In the illustrated embodiment, an offset also exists between the optical axis of the GRIN lens subassembly and the tuned wedge subassembly such that the waveguide termination is designed to terminate a waveguide having an optical axis that is at a predetermined angle with respect to the optical axis of the GRIN lens assembly. In the illustrated embodiment, the predetermined angle is a nonzero angle. Finally, the fiber 100 has been affixed to the GRIN lens subassembly 126 by means of one embodiment of the method described above in conjunction with FIG. 10. Accordingly, the fiber 100 is moved laterally with respect to the GRIN lens subassembly 125 to increase, and perhaps maximize, the magnitude of the primary beam successfully passing through the waveguide termination and spaced apart from the GRIN lens subassembly 125 by a spacing L, to decrease, and perhaps minimize, the magnitude of the back reflection caused by the waveguide termination.

Those skilled in the art to which this application relates will appreciate that other and further additions, deletions, substitutions and modifications may be made to the described embodiments. For example, while AR coatings have not been described in particular, those skilled in the pertinent art are aware of them and their advantages. Certain embodiments of the GRIN-lensed, tuned wedge waveguide termination do include AR coatings further to reduce back reflections.

What is claimed is:

1. A GRIN-lensed, tuned wedge waveguide termination, comprising:
   a GRIN lens subassembly including a GRIN lens having a pitch greater than a quarter pitch such that a primary beam propagating through said GRIN lens subassembly forms a waist; and
   a tuned wedge bonded to said GRIN lens subassembly and having a length selected such that said tuned wedge ends at least proximate said waist, said tuned wedge further having a bevel angle, said bevel angle selected to reduce a back reflection into said waveguide termination wherein said primary beam has an optical axis substantially co-linear with that of said GRIN lens.

2. The GRIN-lensed, tuned wedge waveguide termination as recited in claim 1 wherein said GRIN lens has a pitch of between 0.26 and about 0.35.

3. The GRIN-lensed, tuned wedge waveguide termination as recited in claim 1 wherein said GRIN lens subassembly is composed of glass.

4. The GRIN-lensed, tuned wedge waveguide termination as recited in claim 1 wherein said tuned wedge is composed of glass.

5. The GRIN-lensed, tuned wedge waveguide termination as recited in claim 1 wherein said waveguide is an optical fiber.

6. The GRIN-lensed, tuned wedge waveguide termination as recited in claim 1 wherein said back reflection is less than about −50 dB.

7. A terminated optical fiber, comprising:
  a GRIN-lensed, tuned wedge fiber termination, including:
  a GRIN lens subassembly including a GRIN lens having a pitch greater than a quarter pitch such that a primary beam propagating through said GRIN lens subassembly forms a waist, and
  a tuned wedge bonded to said GRIN lens subassembly and having a length selected such that said tuned wedge subassembly ends at least proximate said waist, said tuned wedge further having a bevel angle, said bevel angle selected to reduce a back reflection into said terminated optical fiber wherein said primary beam has an optical axis substantially co-linear with that of said GRIN lens; and
  an optical fiber coupled to said GRIN-lensed, tuned wedge fiber termination and having a face, a spacing between said face and said GRIN lens subassembly selected based on said back reflection.

8. The terminated optical fiber as recited in claim 7 wherein a nonzero angle exists between an optical axis of said waveguide and an optical axis of said GRIN lens subassembly.

9. The terminated optical fiber as recited in claim 7 wherein a nonzero offset exists between an optical axis of said GRIN lens subassembly and an axis of said tuned wedge.

10. The terminated optical fiber as recited in claim 7 wherein said bevel angle is selected to reduce said back reflection.

11. The terminated optical fiber as recited in claim 7 wherein said spacing is selected to minimize said back reflection.

12. The terminated optical fiber as recited in claim 8 wherein said nonzero angle is selected to minimize said back reflection.

13. The terminated optical fiber as recited in claim 7 wherein said GRIN lens subassembly and said tuned wedge are composed of a translucent material.

14. The terminated optical fiber as recited in claim 7 wherein said back reflection is less than about −50 dB.

15. A method of reducing back reflection to a waveguide caused by a GRIN-lensed, tuned wedge waveguide termination, comprising:
  providing a GRIN-lensed, tuned wedge waveguide termination, including a GRIN lens subassembly having a GRIN lens having a pitch greater than a quarter pitch such that a primary beam propagating through said GRIN lens subassembly forms a waist; and
  providing a tuned wedge bonded to said GRIN lens subassembly having a length selected such that said tuned wedge ends proximate said waist, said tuned wedge further having a bevel angle, said bevel angle selected to reduce said back reflection into said waveguide termination wherein said primary beam has an optical axis substantially co-linear with that of said GRIN lens.

16. The method as recited in claim 15 wherein said GRIN lens has a pitch of between .26 and about .35.

17. The method as recited in claim 15 wherein said GRIN lens subassembly is composed of glass.

18. The method as recited in claim 15 wherein said tuned wedge is composed of glass.

19. The method as recited in claim 15 wherein said waveguide is an optical fiber.

20. The method as recited in claim 15 wherein said back reflection is reduced to less than about −50 dB.

* * * * *